Patented Oct. 12, 1943

2,331,292

UNITED STATES PATENT OFFICE 2,331,292

CATALYSTS AND THE PREPARATION THEREOF

Raymond C. Archibald, Contra Costa County, and Albert E. Smith, Berkeley, Calif., assignors to Shell Development Company, San Francisco, Calif., a corporation of Delaware No Drawing. Application March 11, 1941, Serial No. 382,794

14 Claims. (Cl. 252—210)

The present invention relates to new and improved multi-component catalysts and to a process for their preparation. More particularly the invention relates to the preparation of improved catalysts comprising minor amounts of catalytically active metal and/or metal compounds combined with major amounts of a particular type or form of alumina which acts both as a specific promoter and support. A particular aspect of the invention relates to new and improved catalysts of the hydrogenation-dehydrogenation type which are especially active and selective in the aromatization of hydrocarbons.

Since the invention relates to supported catalysts promoted by a particular type or form of alumina and since these catalysts differ from those of the prior art more in form than in overall chemical composition, it is desirable, before attempting to describe the present catalysts and point out their differentiating characteristics, to refer briefly to a few facts regarding the phenomena of catalyst promotion and the functions of catalyst carriers.

In conversions executed with the aid of solid catalysts the reactions in general take place predominantly at the fluid-solid interface. This is indicated by the fact that at temperatures above a certain threshold temperature the reaction rate is more or less proportional to the available catalyst surface in the reaction zone. Thus, if the available surface of a catalyst is increased, for instance, by applying the catalytically active material as a thin layer on the surface of a substance such as pumice, a large available surface may be provided with a minimum amount of catalytic agent and a considerable increase in reaction rate results. Now, it is known that certain substances have, besides the usual exterior surface, a minute porous structure and have therefore also a large "inner surface." Substances having large inner surfaces are generally active, i. e. adsorptive, and it can be shown that the adsorptive ability of such solids is generally more or less proportional to the extent of the inner surface. Since the catalytic activity is dependent upon the available surface, it would be expected that these adsorptive or active solids would be ideally suited as carriers for the active catalyst. This is known to be the case and such substances as silica gel and active carbon which have exceptionally large inner surfaces are frequently recommended and used to support various catalytically active metals, metal compounds, etc. Another material often recommended and used is adsorptive alumina. When alumina is freshly precipitated it contains a considerable amount of water and has little or no inner surface. By suitably heating the alumina to drive out a portion of the water, small pores are opened up in the interior and it becomes adsorptive. It is then said to be activated. As a result of these well-known facts it can be stated that the primary function of a carrier or support is to provide a large available surface, and that one of the primary and most rudimentary rules in preparing supported catalysts is to apply the catalytically active material to a support offering the maximum available surface.

Although the primary function of a carrier or support material is, as explained, to increase the available catalytic surface with the use of a minimum amount of catalytic agent, it is known that in certain cases the carrier material may also have other functions. Thus, in certain cases the carrier may also act as a promoter. Frequently, certain mixtures of materials have a considerably different order of activity than the components per se. In some cases the catalytic activity is additive. In certain other cases, however, it is higher than the sum of the activities of the separate components. This latter phenomena is known as promotion or activation, and it is said that one or more of the components acts as a promoter or activator. In most cases of catalyst promotion the promoter is applied in rather small amounts in definitely limited concentrations. In certain cases, however, the carrier or support material, besides providing a large surface, acts as a true promoter. This is shown, for example, by the fact that in certain cases one and the same catalytic agent when applied to different carrier materials having comparable inner surfaces has entirely different orders of activity. An excellent example of such promotion is, for instance, the promotion of chromium oxide by alumina. Chromium oxide deposited upon an active alumina is over twice as effective as a dehydrogenation catalyst as the same chromium oxide deposited upon silica gel. This decided promoting effect of the carrier is furthermore not limited to dehydrogenation but is noticed in other reactions such as hydrogenation. In such cases of promotion by the carrier material the chemical composition of the carrier is usually of primary importance. According to Mittasch, who is perhaps the foremost authority on catalysts of this type, promotion of this kind is only observed in such cases where the two catalytic components form inter-metallic compounds. See, for example, Z. physikal Ch.

Bodenstein-Festband 574 (1931). More recent investigation has indicated that such promoter action is not only dependent upon the formation of inter-metallic compounds but that the mixed crystals formed must have a face centered lattice. See, for example, J. A. C. S. 56, 1101 (1934). Activated carbon, for example, which cannot form an inter-metallic compound with the catalyst is not such a promoting carrier. An example of the effect of the composition of the carrier upon the ultimate catalyst is, for instance, seen in U. S. Patent 2,172,534 wherein Grosse recommends the treatment of an alumina carrier with an alkali metal compound prior to the deposition of chromium oxide thereon.

Another important function often exercised by the carrier material is a stabilizing action. It is known that certain catalytically active substances, such, for example, as chromium oxide, have a very desirable activity per se but quickly lose their activity in use. It is also known that when such materials are applied to certain suitable adsorptive supports, excellent catalysts are often obtained which maintain their high order of activity over extended periods of time. One type of material which is especially effective in stabilizing the catalytic activity is alumina. According to A. Mittasch and E. Keunecke, (Z. Elektrochem 38, 666 (1932)) and R. Brill, (Z. Elektrochem 38, 669 (1932)), this stabilizing effect of alumina is due primarily to the fact that the somewhat porous inter-layers of alumina prevent the recrystallization or sintering of the active catalyst.

From the above it is obvious that the various carrier materials are by no means equivalent and that various properties may be imparted to catalysts by the proper choice of carrier materials.

Of the numerous carrier materials available, alumina, in view of its marked superiority in certain respects, is a particularly excellent carrier. The superiority of alumina over most other carrier materials is due largely to the fact that when properly prepared it not only provides a large available surface, but exerts a very beneficial stabilizing effect. Moreover, in many cases alumina functions as a true promoter. Further, alumina is applicable and recognized as advantageous as a carrier material in a wide variety of catalysts.

As a general rule most of the aluminas hitherto employed as carrier materials for various catalytic materials have been prepared synthetically by precipitation from aqueous solutions, followed by washing and activating by heating at temperatures of from about 300° C. to 600° C. In most cases the alumina has been prepared especially for the purpose; in some cases aluminas obtained as by-products from other processes have been used. Also, in view of its relatively low cost and availability, bauxite has in certain cases been recommended. While certain bauxites when properly treated have given fairly good results, bauxites, in general, usually contain considerable undesirable impurities, are non-uniform, and do not compare in quality with the aluminas prepared synthetically.

Although various aluminas have been used and found to be suitable carriers, the results have been in many cases conflicting, and it became generally recognized that the various aluminas are by no means equivalent. This is not surprising since alumina can exist in a large number of forms, some of which have been still little investigated. The forms of alumina most commonly encountered are the alpha, beta, gamma and amorphous forms. There exists, however, also a zeta and perhaps a delta form. These forms, furthermore, exist in various stages of "hydration." Although certain forms of these aluminas are referred to as the "mono-hydrates," "di-hydrates" and "tri-hydrates," recent investigations have shown that the water in these so-called hydrates does not exist as water of crystallization but as chemically combined hydroxide water and that the terms "mono-hydrate," etc. are in reality misnomers. These various forms of alumina may furthermore exist in sub-forms having different crystal lattices. The question of the form of the aluminas is furthermore complicated by the fact that available aluminas often consist of heterogeneous mixtures (for example, "Aluminum Hydroxide B" and "Activated Alumina") and as pseudomorphic and mixed crystals. Besides these various fundamental chemical differences found in aluminas there are certain purely physical differences such as the porosity, pore size, surface charge, etc. which greatly influence their suitability in catalysts. For example, alumina is produced in the so-called "colloidal," "voluminous," "sandy," "chalk-like," "glass-like," "fibrous" and "scaly" forms, according to the particular reagents, concentrations and conditions employed in the preparation. Many specialized methods of preparation, which at first sight appear to differ only in minor details, have been developed to produce certain of these more desirable forms or kinds of alumina. For example, the preparation of a particular type or kind of alumina known as "Aluminum Hydroxide A" is described in Ber. 56, 149 (1923), Ber. 57, 58 (1942), and Ber. 57, 1082 (1924). Also, another form of alumina known as "Aluminum Hydroxide B" is prepared under slightly modified conditions; see Ber. 56, 149 (1923) and Ber. 57, 1082 (1924). By slightly modifying the procedure of preparation still another type of alumina known as "Di-aluminum Hydroxide" can be prepared; see Ber. 64, 1697 (1931). Another form of highly adsorptive alumina known as "Aluminum Hydroxide Cγ" is prepared according to the modified process described in Ber. 56, 149 (1923). Another method for preparing a material similar to "Aluminum Hydroxide Cγ" is described in Ber. 56, 1117 (1923). There are, furthermore, two further modifications of "Aluminum Hydroxide C" which are known as the Cα and Cβ modifications. These are prepared as described in Ber. 58, 2448 (1925). Another method said to produce a particularly excellent type of alumina is described in Z. anorg Chem. 171, 323 (1928). Another excellent type or form of alumina having the composition of the mineral böhmite is prepared as described in Z. anorg Chem. 188, 357 (1930). Another form of adsorptive alumina claimed to be particularly effective is prepared according to the method described in Kolloidchem. Beihefte 41, 329 (1935). This material is known as "Alumina Hydrate T." A modification of it, known as "Alumina Hydrate T'," is prepared by a slightly modified procedure. Still another type of alumina known as "Aluminum Hydroxide D" is prepared according to the method described in Ber. 56, 149 (1923).

The reason for the differences is efficiency of various aluminas is not definitely known. It is most probable, however, that several factors such as extent of inner surface, pore size and surface charge are important. There is, however, another very important factor which appears to involve the particular structure of the surface. It is interesting to note that Adkins and Nissen, J. A. C. S. 46, 130 (1924) postulate that these differences are due to the different spacial relationships of the molecules or "active points" in the alumina, which spacial relationships are determined at least in part by the size and shape of the radicals attached at the time of transition to the solid state. Thus, six distinct types of alumina which were equally effective in catalyzing certain reactions were found by them to be fundamentally different in catalyzing other reactions.

It was quite recently found that a particular form or kind of alumina known as "Activated Alumina" is much superior to the other aluminas hitherto used as catalyst supports. "Activated Alumina" is a particularly hard, crystalline, non-friable alumina consisting largely of a form of "alpha mono-hydrate" alumina and a form of gamma alumina. It is obtained from the crust or scale deposited in the tanks and troughs in the Frickes-Sherwin modification of the Bayer process. This hard, stony, crystalline alumina scale consisting largely of one or more forms of a "trihydrate" and containing appreciable quantities of impurities is removed from time to time with pneumatic drills, crushed and activated. The activation of this material is executed as described in U. S. Patents Nos. 1,868,869 and 2,015,593. The resultant material is an especially hard, crystalline form of alumina containing considerable impurities and having exceptionally high adsorption characteristics. Due to this exceptional ability to adsorb various materials from solutions and gases, for instance, water vapor from air, it has been designated "Activated Alumina." The reason or reasons for the superiority of this particular form of alumina as a carrier in catalysts of the type in question is unknown. It was logical to assume, however, that the superiority of this material was due to a large extent to its large inner surface. That the extent of this inner surface, however, is not the essential or even primary differentiating characteristic is, however, evident from the fact that silica gel which is known to possess an even larger inner surface is much less efficient. Catalysts comprising a catalytically active metal or metal compound supported upon and promoted by "Activated Alumina" are described and claimed in U. S. Patents Nos. 2,184,235 and 2,118,001. The catalysts of the present invention are improved catalysts of this type.

We have found that those superior catalysts prepared by impregnation of "Activated Alumina" with suitable catalytically reactive metals or metal compounds may be greatly improved if the "Activated Alumina" is first subjected to a suitable heat treatment prior to impregnation. As stated above, "Activated Alumina" prepared according to the methods of U. S. Patents Nos. 1,868,869 and 2,015,593 is so designated in view of its excellent adsorptive properties. It is produced and intended primarily for use as an adsorbent and is widely used in commerce for conditioning air, drying refrigerants, solvent recovery and similar purposes. It is therefore purposely activated in such a manner and to such a degree as to have the maximum adsorptive characteristics in combination with a minimum hysteresis in desorption. The adsorptive ability of adsorptive solids such as alumina is dependent upon their degree of hydration. When such materials are dehydrated by heating, the adsorptive characteristics gradually increase, pass through a maximum and then decrease as the dehydration becomes more complete. The amount of combined water retained at the point of maximum activity (adsorptive ability) varies somewhat with different materials. In the case of "Activated Alumina" the maximum adsorption corresponds to a residual water content after activation of about 7%–12%. In the preparation of "Activated Alumina," therefore, the dehydration (or activation) is adjusted to produce a material containing a residual water content within this range. There is, moreover, another reason why in the preparation of "Activated Alumina" the dehydration is not carried much below 12% of residual water, and this is that further dehydration in general increases the hysteresis of desorption and renders the material less suitable for its intended purpose. According to the process of the present invention, "Activated Alumina" is further heated and dehydrated prior to impregnation until the residual water content is reduced to below 5%, and preferably between 1% and 3%. Since "Activated Alumina" itself is activated to approximately maximum adsorptive efficiency, it is obvious that the preheating treatment of the present invention does not increase its suitability as an adsorbent and is not to be considered an activation treatment in the common sense of this term.

The dehydration of "Activated Alumina" is effected according to the process of the present invention by subjecting "Activated Alumina" to a suitable heat treatment. This may be conveniently effected batch-wise, intermittently or continuously in manners similar to those used in preparing the "Activated Alumina," dehydrating clays, regenerating adsorbent earths, etc. The temperature of the dehydration is preferably between 300° C. and 900° C. The time required to effect a suitable heat treatment depends upon the prevailing temperature, being considerably longer when the lower temperatures are employed and, conversely, considerably shorter when higher temperatures within the above range are employed. For example, when heating granules of activated alumina of about 8–14 mesh and removing the liberated water by slow current of inert gas, a suitable heat treatment may be obtained under any set of conditions of time and temperature falling in the area between the curves defined by the following coordinates:

| Time | Temperature |
|---|---|
|  | °C. |
| 1 hr | 750–800 |
| 2 hours | 700–800 |
| 4 hours | 650–760 |
| 6 hours | 620–750 |
| 8 hours | 600–730 |
| 10 hours | 580–710 |
| 12 hours | 570–700 |
| 20 hours | 540–660 |
| 30 hours | 520–640 |

The above correlated conditions of time and temperature are for the treatment of ordinary "Activated Alumina" of, for example, 8–14 mesh in a non-stagnant condition, i. e. while removing the liberated water. If the material treated is in a finer state of subdivision and/or agitated with a more efficient removal of the liberated water vapors, these given times and/or temperatures may be reduced somewhat. Conversely, if the "Activated Alumina" particles are larger, for instance, of the size normally obtained when removing the alumina scale, and/or the removal of liberated water vapor is less efficient, they may be increased somewhat. Care should be exercised, however, that the heat treatment does not effect complete dehydration since under such circumstances the alumina is largely converted into a form which is almost entirely inert as a catalyst support. In general, the heating should be carried out in such a manner as to leave at least about 0.2% residual water.

Instead of heating "Activated Alumina," by which term we mean the material prepared as described above according to the methods of U. S. Patents Nos. 1,868,869 and 2,015,593, we may also treat the impure crystalline trihydric alumina scale from which "Activated Alumina" is produced. Obviously, when treating this scale the time and/or temperature of heating will be considerably longer than those quoted above for "Activated Alumina" and will be longer than those employed in preparing "Activated Alumina."

Although we subject "Activated Alumina" to a further dehydration treatment to produce a product having a lower content of residual water, it is not to be inferred that we consider the water content to have any direct bearing on the suitability of the alumina. The superiority of the "Activated Alumina" which has been subjected to the further dehydration is definitely due to a difference in the surface characteristics, and the water concentration is most probably only a subordinate characteristic which, in the case of this particular form of alumina, can be conveniently correlated therewith. Other aluminas containing from 0.2% to 5% of residual water are not equivalent.

The material prepared as above described differs considerably from the numerous aluminas hitherto recommended, even when these contain the same amount of residual water. It is a hard, crystalline form or type of alumina containing appreciable amounts of sodium salts and small amounts of other "impurities," which may or may not be responsible to some extent for its superior property as a catalyst support. It furthermore differs considerably from the "Activated Alumina" more recently found to be a superior carrier. Commercial "Activated Alumina," for example, contains about 7%–12% water and is capable of adsorbing moisture from air at 100% efficiency until it has taken up about 12%–14% of its dry weight. Beyond this point it continues to adsorb moisture at a decreased efficiency until it is saturated, at which time it contains 20%–25% of adsorbed water. By a simple heat treatment below about 300° C. the adsorbed water is easily and completely removed. There is little or no hysteresis. The alumina prepared therefrom, according to the described method, contains less than 5% water. Also, the adsorptive characteristics are different. The main difference between the alumina prepared as described and other aluminas such, in particular, as "Activated Alumina," however, is in its behavior when used as a carrier for various catalytic metal compounds. When suitable catalytic metal compounds are incorporated in the surface of the alumina, prepared as described, catalysts of much greater activity are obtained. This increase in activity is furthermore not due to any increase in catalytic activity of alumina per se but is definitely due to an improved promoting action on the activity of the supported catalytic metal compound. The superiority of the present catalysts over those prepared from "Activated Alumina" is illustrated in the following examples.

*Example I*

"Activated Alumina," purchased from the Aluminum Ore Company, was heat-treated in the manner described and then impregnated with chromium oxide (11% Cr) in the usual manner. A quantity of the non-heat-treated "Activated Alumina" was impregnated in the same manner with the same quantity of chromium oxide. These catalysts were employed in the dehydrogenation of methyl cyclohexane under the following comparable conditions:

| | |
|---|---|
| Feed rate | 25 cc. per hour |
| Temperature | 490° C. |
| Pressure | Atmospheric |
| Catalyst bed | 16" x ⅝"=70 cc. |

The conversions to toluene obtained initially, after 6 hours and after 24 hours of continuous use, are listed in the following table:

| Conditions of heat treatment | Conversions | | |
|---|---|---|---|
| | Initial | 6 hrs. | 24 hrs. |
| | Per cent | Per cent | Per cent |
| None | 50 | 73 | 64 |
| 6 hrs. at 700° C | 92 | 99 | 89 |

*Example II*

"Activated Alumina" was heat-treated as described and then impregnated with chromium oxide (11% Cr) in the usual manner. A quantity of the non-heat-treated "Activated Alumina" was impregnated in the same manner with the same quantity of chromium oxide. These catalysts were employed in the cyclization of n-heptane under the following comparable conditions:

| | |
|---|---|
| Space velocity (liquid hourly) | 0.36 |
| Temperature | 490° C. |
| Pressure | Atmospheric |

The conversions to toluene obtained initially, after 3 hours and after 6 hours of continuous use, are listed in the following table:

| Conditions of heat treatment | Conversions | | |
|---|---|---|---|
| | Initial | 3 hrs. | 6 hrs |
| | Per cent | Per cent | Per cent |
| None | 33 | 43 | 37 |
| 6 hrs. at 700° C | 88 | 57 | 47 |

The improvement illustrated in the above two examples is furthermore magnified when certain promoters are incorporated in the catalyst. Example III gives comparative cyclization runs on two promoted catalysts differing only in the form of the alumina.

*Example III*

"Activated Alumina," purchased from the Aluminum Ore Company and prepared according to the methods of U. S. Patents Nos. 1,868,869 and 2,015,593, was heat-treated in the manner described and then impregnated with chromium oxide (11% Cr) in the usual manner. The catalyst was then promoted with 0.7% cerium and 1.2% potassium. A quantity of the non-heat-treated "Activated Alumina" was impregnated in the same manner with the same quantities of catalytic agents. These catalysts were then employed in the cyclization of normal heptane under the following comparable conditions:

Feed rate_____ 25 mm. per hour
Temperature_____ 490° C.
Pressure_____ 1 atmosphere
Catalyst bed_____ 16" x ⅝"=70 cc.

The conversions obtained initially and the average conversions for 10 hours of continuous operation are listed in the following table. The lower initial conversions are due to a small induction period preceding the maximum activity.

| Conditions of heat treatment | Conversions | |
|---|---|---|
| | Initial | 10 hrs. |
| | Per cent | Per cent |
| None | 37 | 54.2 |
| 3 hrs. at 600–700° C | 57 | 70.8 |
| 6 hrs. at 700° C | 74 | 77.8 |

It is apparent that the catalysts prepared from the alumina pretreated in the manner described are vastly superior. It is to be particularly emphasized that the superiority of the present catalysts is due primarily to the particular form or character of the surface of the alumina at the time of the deposition of the catalytic metal or metal compound thereon. Thus, in the application of "Activated Alumina" catalysts such as described by Groll and Burgin in U. S. Patent No. 2,184,235, the catalyst is often subjected to conditions (for instance, in the regeneration treatment) which are capable of bringing about the same degree of dehydration as that effected in the present prior heat treatment. This further dehydration of the "Activated Alumina" carrier after impregnation, however, shows no indication whatsoever of the present phenomenon. The "Activated Alumina" catalysts, regardless of what heat treatment they may be subjected to after impregnation, are never any more active than when originally prepared.

The material prepared according to the above-described process is an especially suitable carrier material for various catalytic metals and/or metal compounds. The compound catalysts may be prepared therefrom in a variety of suitable manners such, for instance, as described in U. S. Patent No. 2,184,235. A convenient method comprises impregnating the alumina, in the form of granules or pellets of the desired size, with a solution, preferably an aqueous solution, of a compound of the metal which it is desired to combine with the alumina, and then drying. The concentration of the impregnating solution used in each particular case will depend upon the solubility of the particular metal compound at the temperature of the impregnation and upon the desired concentration of the active metal or metal compound in the compound catalyst. The procedure to be followed in drying or treating the impregnated material will vary depending upon the chemical constitution of the compound catalyst. In general, the material may be dried in air at temperatures as high as 800° C., and even higher in some cases. In other cases it may be desirable to effect the drying with inert gases such as nitrogen, or reducing gases such as hydrogen, hydrocarbons, etc.

Many of the metal compounds which are desired as catalytically active constituents of the compound catalysts, such as the oxides and sulfides, are not sufficiently water-soluble to permit direct impregnation of the alumina with aqueous solutions of them. In such cases, the alumina may be impregnated with a solution of a salt which can be converted to the desired metal oxide or metal sulfide by calcination or hydrogen sulfide treatment, respectively, of the impregnated material. The desired active metal oxide-containing catalysts may also be obtained by precipitating the corresponding metal hydroxide on the surface of the alumina and subjecting the thus-obtained material to calcination under suitable temperature conditions.

Conditions of preparation should be such that the essential physical structure and surface characteristics possessed by the alumina are not materially altered. As stated above, we have found that it is of primary importance with respect to the catalytic activity that the alumina or mixture of aluminas be in just the proper form at the time of deposition of the catalytic reactive metal compound. This statement refers to the catalytic reactive compound itself and not merely to a preliminary form of the metal. For example, in the preparation of supported chromium oxide catalysts it is not the form of the alumina at the time of impregnation with chromium nitrate or chromic acid which is of importance but the form of alumina at the instant when the chromium compound, regardless of its original form, becomes deposited upon the surface of the alumina in the stable oxide form. The various aluminas, however, undergo hydration reactions and structural rearrangements, especially at a somewhat elevated temperature in the presence of moisture. In preparing catalysts by the impregnation of the alumina with aqueous solutions of appropriate metal salts therefor, it is desirable to convert the metal nitrate, acid or other impregnated form into the desired catalytically active form relatively quickly. For example, if an "Activated Alumina" is treated as described above and then impregnated with an aqueous chromic acid solution, a catalyst prepared by a relatively quick and efficient drying and conversion of chromic acid to chromic oxide is preferred to one in which the drying and conversion of the chromic acid to chromic oxide is delayed and/or effected very slowly.

The material which is incorporated in the surface of an alumina to result in the catalysts of the present invention may be a metal, a mixture of metals, a metal compound, a mixture of metal compounds, or one or more metals and one or more metal compounds. Said materials may or may not be in chemical combination with the alumina on the surface thereof. Suitable catalysts are those which, by virtue of their mode of preparation, comprise a metal or a metal compound such as a metal oxide, halide, sulfide, selenide, telluride, phosphate, manganate, molybdate, chromate, bichromate and the like incorporated in the surface of the alumina. Suitable catalysts are those which comprise a metal or a catalytic compound of a metal of the group consisting of the transition metals and Pb, Sn, Bi and Ge. The transition metals consists of Sc, Ti, V, Cr, Mn, Fe, Co, Ni, Cu, Zn in the first series and Y, Zn, Nb, Mo, Ma, Ru, Rh, Pd, La, the rare earths, Hf, Ta, W, Re, Os, Ir, Pt, Ac, Th, Pa, and U in the remaining series. Excellent catalysts may also be obtained by incorporating at least one oxide, sulfide, selenide, telluride, halide, phosphate, manganate, molybdate, chromate or bichromate in the surface of the alumina.

In general, excellent catalysts can be obtained by incorporating one or more oxides and/or sulfides of the above-listed metals in the surface of the alumina. Some of these catalysts may be prepared by direct impregnation of the alumina with a solution of the metal compound which it is desired to incorporate in the surface thereof, while others can only be prepared indirectly, for example, by impregnation with one compound followed by a conversion treatment whereby said compound is converted to the desired compound. In any case, anyone skilled in the art can readily prepare a catalyst of any desired initial composition.

Of these various catalytic metals and metal compounds, a preferred group having an appreciable cyclizing activity comprises compounds of these heavy metals which are left-hand members of groups IV, V and VI of the Periodic Table. Those which are members of groups VII and VIII of the Periodic Table such as Fe, Co, Ni, Pt and Mn are particularly strong dehydrogenating catalysts.

A preferred subgroup of compound catalysts embraces those comprising the above-described specially prepared alumina and one or more chromium compounds. The chromium may be present in the compound catalyst in any chemical combination, either in a positive or negative state. For example, the chromium may be present in any one or a plurality of compounds such as $Cr(OH)_3$, $CrO_3$, $Cr_2O_3$, $Cr_2S_3$, $Cr_3S_4$, $CrS$, $CrCl_3$, $Cr_2(SO_4)_3$, $Cr(NO_3)_3$, $Na_2CrO_4$, $K_2CrO_4$, $K_2Cr_2O_7$, $Na_2Cr_2O_7$, $FeOCr_2O_3$, $Al_2(CrO_4)_3$, $Cr(OCl)_2$, and the like.

The invention is not restricted to the use of compound catalysts containing any specific amount of the active metal or active metal compound. The optimum concentration of said active material in the compound catalyst will generally depend upon the particular material to be treated and upon the conditions of temperature, space velocity, etc., under which the conversion is to be effected. In general, the alumina is in gravimetric excess of the active metal or metal compound. Good results have been obtained by employing compound catalysts containing from about 0.5% to about 40% by weight of the active metal or active metal compound. A suitable concentration range is generally from about 0.5% to about 20% by weight of the catalyst mass. In the case of the compound catalysts comprising a chromium compound as the active agent, good results are generally obtained with catalysts containing up to about 30% by weight of chromium.

The solid catalysts of the present invention may be employed in the conventional manners and for the execution of any of the catalytic conversions for which the supported catalytic metal compounds are known to be effective. In general, the desired quantity of the catalytic material in the form of particles or granules of the desired size is packed into a reaction tube or reaction chamber of any suitable material and capacity. The catalytic material is maintained in the desired temperature range, preferably by suitable external heating means, while the material to be treated in either the liquid or vapor phase, but more usually in the vapor phase, is passed into contact with it at the desired space velocity and under the desired pressure. Conversions for which the present catalysts are especially suited are the dehydrogenation, cyclization, reforming, hydroforming and desulfurization of hydrocarbons.

We claim as our invention:

1. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is above 0.2% but below 5% and impregnating the thus-treated alumina with a dehydrogenating metal compound.

2. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is within the range of 1% and 3% and impregnating the thus-treated alumina with a dehydrogenating metal compound.

3. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is above 0.2% but below 5% and impregnating the thus-treated alumina with a dehydrogenating metal oxide.

4. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is above 0.2% but below 5% and impregnating the thus-treated alumina with a catalytic compound of a metal of the transition series of the Periodic Table.

5. Process for the production of improved supported catalysts comprising the steps of heating "Activated Alumina" at a temperature between 600° C. and 900° C. to a point beyond that corresponding to the maximum adsorptive ability where the water content as determined by ignition is above 0.2% but below 5% and impregnating the thus-treated alumina with a dehydrogenating metal compound.

6. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is above 0.2% but below 5% and impregnating the thus-treated alumina with a catalytic compound of a metal selected from the left-hand column of groups IV, V and VI of the Periodic Table.

7. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is above 0.2% but below 5% and impregnating the thus-treated alumina with a catalytic compound of chromium.

8. Process for the production of improved supported catalysts comprising the steps of heating an alumina of the class consisting of the hard, stony, crystalline alumina scale, formed in the precipitation tanks and discharge pipes in the Bayer process and its modifications for the production of alumina, and "Activated Alumina" prepared therefrom by activation to approximately maximum adsorptive ability, at a temperature between 600° C. and 900° C. to a point beyond that corresponding to the maximum adsorptive ability where the water content as determined by ignition is above 0.2% but below 5% and impregnating the thus-treated alumina with chromium sesqui oxide.

9. Method for the preparation of supported catalysts comprising an active alumina support impregnated with a catalytic metal compound which comprises heating "Activated Alumina" under conditions of time and temperature falling in approximately the area between the curves defined by the following coordinates:

| Time, hours | Temperature |
|---|---|
| | °C. |
| 1 | 750–800 |
| 2 | 700–800 |
| 4 | 650–760 |
| 6 | 620–750 |
| 8 | 600–730 | and impregnating the thus-treated alumina with a dehydrogenating metal compound.

10. Catalyst prepared according to the process of claim 1.

11. Catalyst prepared according to the process of claim 2.

12. Catalyst prepared according to the process of claim 3.

13. Catalyst prepared according to the process of claim 4.

14. Catalyst prepared according to the process of claim 5.

RAYMOND C. ARCHIBALD.
ALBERT E. SMITH.